Sept. 15, 1959  A. F. HRUBEC  2,903,994
APPARATUS FOR OSCILLATING A MOVING ARTICLE CARRIER
Filed June 6, 1958  2 Sheets-Sheet 1

Inventor.
Arthur F. Hrubec.
By Joseph O. Lange
Atty.

Sept. 15, 1959     A. F. HRUBEC     2,903,994
APPARATUS FOR OSCILLATING A MOVING ARTICLE CARRIER
Filed June 6, 1958     2 Sheets-Sheet 2
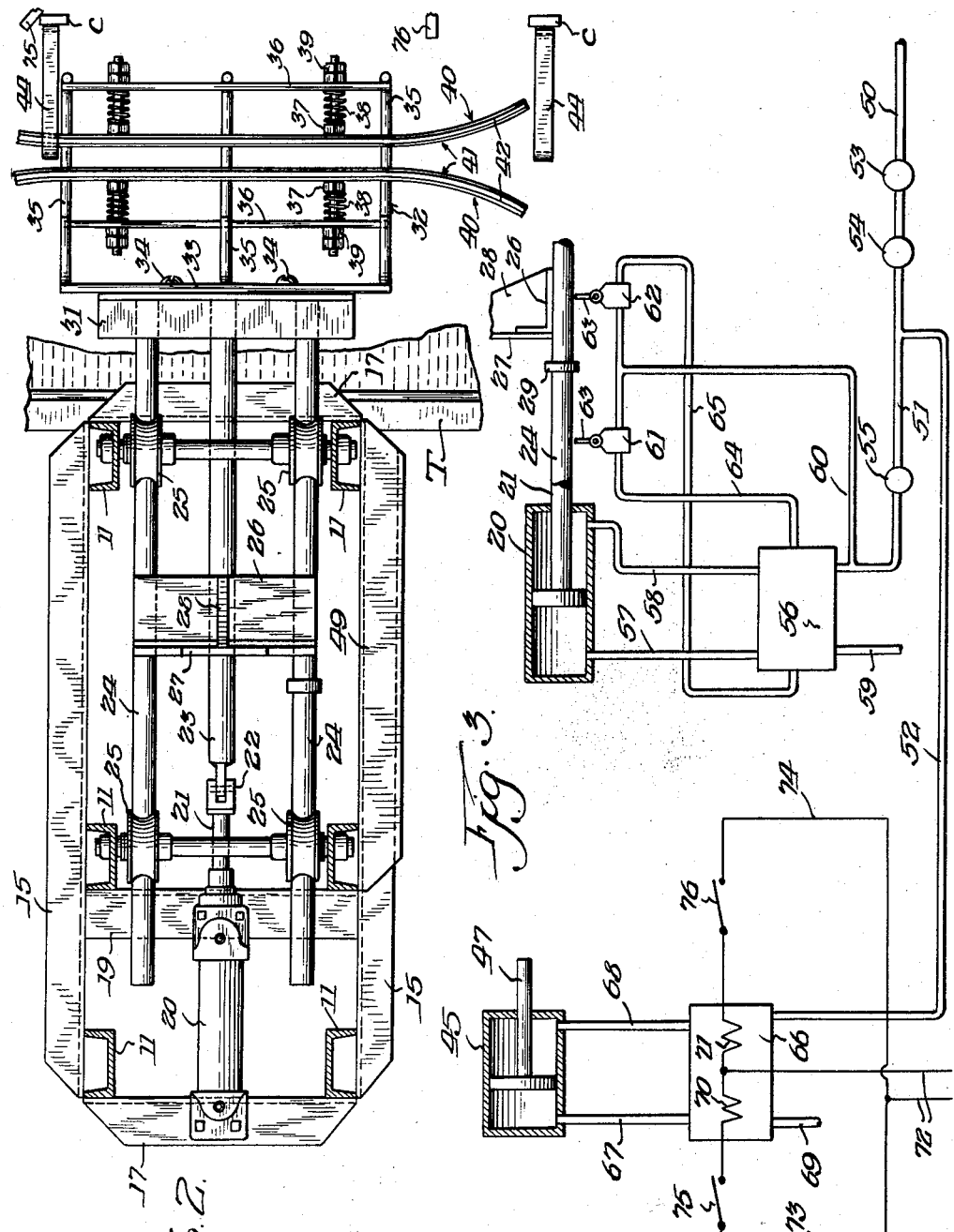
Inventor.
Arthur F. Hrubec
By Joseph O. Lange
Atty.

United States Patent Office 2,903,994
Patented Sept. 15, 1959

2,903,994
APPARATUS FOR OSCILLATING A MOVING ARTICLE CARRIER

Arthur F. Hrubec, Chicago, Ill., assignor to Crane Co., Chicago, Ill., a corporation of Illinois Application June 6, 1958, Serial No. 740,369

10 Claims. (Cl. 118—6)

The present invention relates generally to automatic apparatus for transverse oscillation of traveling article carriers or the like, and more particularly to apparatus for automatically imparting wriggling or sinuous movement to traveling article carriers for a portion of the travel thereof.

Briefly, the invention is disclosed as embodied in mechanism employing a fluid-actuated cylinder and piston arranged for continuous reciprocation transversely of the path of article carriers traveling successively therepast and carrying articles such as pipe fittings through a galvanizing bath. A guide head carried by the piston rod and a bracket extending from each carrier are arranged to interengage as the carrier approaches the head so that the reciprocation of the piston rod is transmitted to the carrier, resulting in a sinuous or wriggling motion of the carrier and articles as they travel along the head and past the cylinder and piston. A fluid-actuated reciprocable cylinder and piston of greater effective area than that of the continuously reciprocating cylinder and piston are arranged for engagement of the piston rod, when projected, with abutment means on the continuously reciprocating piston rod to stop the same at a point intermediate its extreme positions such as to locate the guide head in the path of the carrier brackets. As the bracket engages the head, movement of the carrier operates control means to effect actuation of the reciprocable cylinder and piston for disengagement from the reciprocating piston rod and thus allow resumption of reciprocation thereof, with the consequent wriggling movement of the carrier and articles. As the carrier bracket leaves the guide head, the control means are operated by the carrier movement to actuate the reciprocable cylinder and piston for projection of the piston rod to stop the reciprocating piston rod so that the bracket of the succeeding carrier may properly engage with the guide head, whereupon the control means are operated to again allow reciprocation of the guide head.

The wriggling or sinuous motion of the carriers and of the articles moving through the zinc galvanizing bath results in a wiping, washing, or shaking off of excess zinc coating on the articles by the liquid bath, which tends to accumulate on and cling to the articles in an amount greater than required for proper coating and to form beads thereon when the articles are withdrawn from the bath. Such beads not only are unsightly and tend to give the impression that the articles are inferior, but also prevent threading or like operations on the articles in chucking machines or the like because the beads interfere with proper positioning of the article in such machines, and result in an unduly high proportion of scrapped articles. Such beading is avoided by the wiping or shaking off action effected by the oscillation of the articles transversely of their path of travel, which leaves a substantially even coating on the articles without an excess to gather and solidify into drops or beads.

The invention of course is not restricted to employment in galvanizing operations, since it may be utilized wherever articles are moved by a carrier of such type as to allow of movement laterally or transversely of the path thereof. Thus, articles which pass through a bath of water or other liquid may be dried quickly during travel after such passage by means of the shaking action, which effects greater and quicker removal of liquid than would otherwise be the case.

It is an object of the present invention to provide apparatus for effecting sinuous movement of articles moving through a galvanizing bath to prevent bead formation thereon.

Another object is the provision of apparatus for oscillating transversely of its path a carrier moving along a liquid bath and carrying articles through the bath so as to result in a sinuous or zigzag movement of the articles in the bath.

Another object is the provision of apparatus for imparting a transverse or lateral component to the movement of an article carrier or the like to effect a resultant sinuous or weaving movement thereof.

A further object is the provision of apparatus for giving a zigzag or sinuous motion to an article carrier or the like during a portion of the travel thereof which operates automatically under the control of the carrier movement.

Another object is the provision of automatic apparatus controlled by movement of article carriers or the like traveling therepast for imparting a lateral shaking movement to the carriers during such travel.

Other and further objects, advantages, and features of the invention will be apparent to those skilled in the art from the following detailed description, in conjunction with the accompanying drawings, in which:

Fig. 2 is a horizontal sectional view taken substantially as indicated by the line 2—2 of Fig. 1; and Fig. 3 is a diagrammatic view of the apparatus, showing valves, fluid lines, and electrical circuitry by which the apparatus is operated and controlled.

Figure 1:
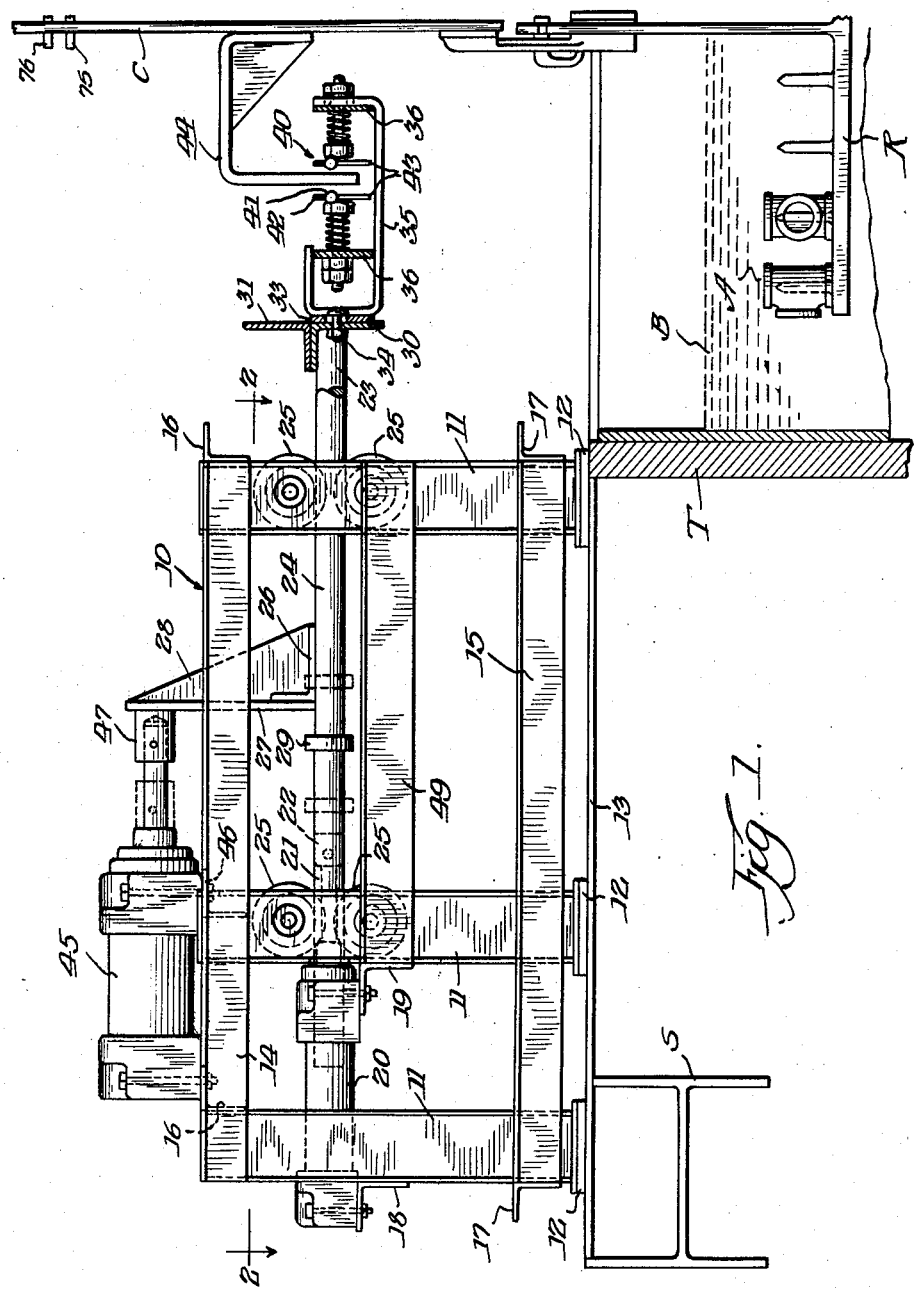
Fig. 1 is a side elevational view of the apparatus, partly in section, with certain parts omitted for clearness.

Referring first to Figs. 1 and 2, there is shown a galvanizing kettle or tank T containing a molten zinc galvanizing bath B in which articles A such as pipe T's are submerged and moved on carrier racks R suspended from carriers C depending from overhead conveyor means (not shown) by which the carriers are moved in a path over the galvanizing tank. Mounted on the edge of the tank and a suitable exterior support S is a frame 10 comprising pairs of uprights 11 spaced longitudinally of the frame, with the uprights of each pair spaced laterally and secured as by welding on bottom pads 12. The pads are secured in any suitable manner to longitudinally extending bottom members 13. In the present case, three pairs of uprights 11 are shown, the three uprights along each side being connected at their upper and lower ends by longitudinal members 14 and 15, respectively, and the uprights of the pairs at the ends of the frame 10 having upper and lower connecting members 16 and 17. The frame 10 is, as shown, arranged so as to be directed transversely of the path of the carriers C, and with what may be termed its forward end spaced therefrom. Secured to the rear pair of uprights 11 intermediate the height thereof is a mounting member 18, and a similar member 19 is similarly provided on the intermediate pair of uprights. A pneumatically-actuated cylinder 20 is bolted or otherwise secured on the mounting members 18 and 19 with its axis and the piston rod 21 of its piston extending transversely of the carrier path, the rod 21 projecting forwardly from the cylinder, or toward the carrier path. To the outer end of the piston rod 21 there is secured, as by a clevis 22 or other suitable means, a piston rod extension 23, which may be considered a part of the piston rod and which projects forwardly of the frame. Extending parallel to the piston rod in spaced relation on each side thereof and in substantially the same horizontal plane are guide rods 24 engaged between guide rollers 25 and projecting forwardly from the frame like the piston rod. A pair of vertically spaced rollers 25 is mounted on each of the forward and intermediate uprights 11 in the vertical plane of the adjacent guide rod 24 to receive the rod in guided and supported relation. The guide rods 24 and the piston rod, specifically the extension 23, are secured together in the described relation at a point intermediate the lengths thereof by a tie member 26, shown in this instance as an angle member, which may be welded to the rods. The tie member 26 also serves as the base of an abutment or stop comprising a vertical plate 27 disposed transversely of the rods and projecting above the plane of the upper frame members 14 and 16. A gusset or brace plate 28 is secured to the forward face of the stop plate and to the tie member 26. A collar 29 is fixed on one of the rods 24 for a purpose hereinafter explained. At their forward ends, the piston rod and the guide rods 24 are tied together by a transverse member 30 welded or otherwise secured thereto, providing a vertically disposed plate portion. The member 30 is illustrated as an angle member having one flange overlying the rods and the other extending along and depending below the rod ends to serve as the plate portion. It will be clear that the piston rod 21, extension 23, and guide rods 24 comprise a unit which may be designated piston rod means for convenience. A stiffening member 31 is suitably secured on the tie member 30, as for example the angle member illustrated as disposed with one of its flanges extending upwardly in the same plane as the plate portion of the tie member to add to the rigidity and strength of the construction.

The member 30 serves as a mounting member for securing on the piston rod means a guide head, generally designated 32, for interengagement of the apparatus and the carriers C as they travel by. The head 32 is in the general form of a relatively light framework comprising a plate 33 secured in face-to-face and preferably vertically adjustable relation to the plate portion of the tie member 30 as by bolts 34. A plurality of relatively light rods 35 are provided, in this instance three, each bent to provide a forward upstanding end on a lower horizontal portion extending rearwardly to an upwardly bent portion which has a forwardly bent end portion at its upper end. The bent rods 35 are welded to the plate 33 at suitable intervals therealong by their upwardly bent rear portions, with a pair of vertical supporting plates 36 welded respectively to the upstanding forward portions and between the lower horizontal and upper forwardly extending portions of the rods. Each of these plates 36 has a plurality of horizontally spaced apertures therein through each of which a bolt 37 slidably extends, with its head end toward the other plate 36. A compression spring 38 is disposed on each bolt to extend between the bolt head and the adjacent plate 36 to urge the bolt in the direction of the other supporting plate, movement of the bolt in that direction being limited by locked nuts 39 on the other end of the bolt for engagement with the plate 36. A pair of carrier guide rails or members 40 are secured, as by welding, one to the heads of the bolts mounted in one plate 36 and the other to the heads of the other spring-mounted bolts, to extend substantially parallel to each other and to the carrier path. Each guide member is shown as composed of a round rod or bar 41, which is the part actually secured to the bolt heads, and a flat strip 42 disposed edgewise on the upper surface of the bar and welded thereto. A pair of lugs 43 are welded or otherwise secured to the lower surface of each bar 41 to extend downwardly therefrom directly above the lower horizontal portions of the bent rods 35 disposed at the opposite ends of the guide head 32, to limit downward swinging of the resiliently mounted bolts 37 and guide members 40, by engaging with the bent rods. The disposition of the parts is such that the forward portion of the guide head is spaced rearwardly from the carrier path by an appropriate distance, and the guide members 40 are spaced from each other at their closest approach under the urging of the springs 38 so that suitable means on the carriers may engage therebetween during passage of the carriers along the head. The ends of the members project beyond the guide head ends and are curved away from each other to facilitate entry and departure of the engaging means of the carriers. Such means are shown as a bracket 44 secured on each carrier slightly above the level of the guide head 32, the bracket comprising a strap bent to general U-shape with one leg fixed to the carrier C and the other depending substantially parallel to the carrier for engagement between the guide members 40, and a gusset reinforcingly disposed within the bent strap.

A pneumatically-actuated cylinder 45 of greater effective area than the cylinder 20 is mounted on the rear upper cross member 16 of the frame and an additional upper cross member 46. The cylinder 45 is arranged with its axis substantially in the same vertical plane as the axis of cylinder 20, and its piston rod 47 extending forwardly substantially parallel to the piston rod 21 in position to engage the abutment plate 27. A ram cap may be secured on the end of the rod 47. The cylinder 45 is arranged to be actuated by means hereafter described to project the piston rod 47 into engagement with the plate 27 to halt reciprocation of the piston rod means of cylinder 20 when a carrier C in its travel approaches the guide head 32. The cylinders 20 and 45 are preferably actuated by air under pressure from a common source, so that by reason of the greater area of cylinder 45 it will overcome and stop operation of cylinder 20. Of course, the two cylinders may be supplied with air or other actuating fluid from different sources, if desired, and in such case the respective pressures and effective areas are so related that greater force is exerted by cylinder 45 than by cylinder 20. The location and stroke of the cylinder 45 and the location of the stop plate 27 on the piston rod means of cylinder 20 are chosen so that the piston rod means is stopped at a position intermediate the limits of the stroke thereof, in which position the guide head 32 is located with the guide members 40 astride the path of the brackets 44, as shown in the drawings. The brackets may thus readily enter and leave the guide head as the carriers pass therealong, and as they travel through the head are moved back and forth transversely of the carrier path during such travel by reciprocation of the head with the piston rod means, being given a weaving, sinuous, or wriggling motion. The carriers C and the article racks R and articles A of course are moved correspondingly, the carriers having relative to the conveyor means from which they depend such movement, whether by design or because of necessary tolerances between parts, or the conveyor means having capacity for such rocking or twisting movement, as to allow oscillation of the carriers transversely of their path. Reciprocation of the piston rod means, or more precisely, reversal of the direction of movement of the rod means, is effected through valve means including pilot valves or similar elements controlled by the collar 29 on one of the guide rods 24. A support 49 for mounting such elements adjacent the collar may conveniently be secured to and extend between the forward and intermediate uprights 11 on the side of the frame at which extends the guide rod carrying the collar.

Actuation of the reciprocating mechanism is effected by the means and arrangement shown diagrammatically in Fig. 3. Air or other actuating fluid under pressure is supplied to the cylinders 20 and 45 from any suitable source, not shown, through a conduit 50, which has branches 51 and 52 leading respectively to the cylinders 20 and 45. An oiler 53 and a filter 54 may be interposed in the line 50, and a pressure regulator 55 in the branch 51. The branch 51 is connected to the inlet of a master control valve 56 for communication with one of two outlet pipes 57 and 58 respectively leading to the rear and forward ends of the cylinder 20. Valve 56 operates to connect the inlet to the outlet 57 to project the piston rod 21, while connecting the outlet 58 to an exhaust 59, or to connect the inlet to the oulet 58 for retracting the piston rod, with the outlet 57 opening the rear end of the cylinder to the exhaust 59. A pilot line 60 branches from the line 51, and is branched to communicate with a pair of pilot valves 61 and 62 each of which is normally closed and has a roller, lever, cam, or like device 63 depressible or otherwise movable to open the valve. A line 64 leads from valve 61 to the valve 56 for effecting movement of a valve element thereof in a direction placing the outlet line 57 in communication with line 51, and line 58 with outlet 59. A similar line 65 connects the valve 62 with valve 56 for reverse operation. The pilot valves 61 and 62 are mounted on support 49 in suitably spaced relation with the collar 29 therebetween, for engagement of their operating devices 63 by the collar. As the piston rod means moves forwardly, the collar 29 engages and operates the device 63 of valve 62 for momentary opening of the valve to allow actuating fluid from pilot line 60 to operate the valve 56 as described. This reverses the movement of the piston rod means, which then is retracted until the valve 61 is momentarily opened by the collar 29 to again cause projection of the piston rod 21 and the parts secured thereto. This piston rod means thus automatically effects continuous reversal of its direction of movement. Reciprocation of the guide head 32 is continued without interruption, aside from shutting down of the apparatus as by closing supply line 50, except as the cylinder 45 operates to stop the piston rod means of cylinder 20, as already described.

Operation of cylinder 45 is by means of the actuating fluid passing through the supply line 50 and its branch 52 to a solenoid-operated control valve 66. The line 52 is connected to the inlet of valve 66 to be placed in communication thereby with one of two outlet conduits 67 and 68 leading to opposite ends of cylinder 45, the other of the outlets being at the same time placed in communication with an exhaust 69. As will be apparent from Fig. 3, the piston rod 47 is projected when fluid is admitted to the rear end of cylinder 45 through the outlet 67, and is retracted when the fluid is supplied through the outlet line 68 to the forward end of the cylinder. The valve 66 is of the double solenoid type, being operated to connect one of the outlets to the line 52 while opening the other to exhaust 69 by one or the other of a pair of operating coils 70 and 71 each having an energizing circuit comprising a pair of leads 72 from a source of electricity, not show. One of the leads has a common connection directly to one side of each coil and the other is connected through branch leads 73 and 74 respectively to the other side of coil 70 and 71. Normally open switches 75 and 76 are interposed in the lines 73 and 74 respectively to open and close the circuits through the coils 70 and 71. Momentary closing of the switch 75 causes energization of coil 70, effecting operation of the valve 66 to place the outlet conduit 67 in communication with the branch supply line 52, and the conduit 68 with the exhaust 69. Similarly, closing of switch 76 connects outlet 68 with the fluid inlet, and opens outlet 67 to exhaust. Closing of switch 75 thus effects projection of piston rod 47 to engage the abutment means of the piston rod means of cylinder 20 to stop reciprocation thereof as already explained, while closing of switch 76 effects retraction of the piston rod to allow resumption of the reciprocation. The switches are arranged for operation by the movement of the carriers C, being mounted on any suitable support adjacent the path of the carriers and having operating arms or levers projecting across the carrier path to be engaged and moved by the carriers for momentary closing of the switches, as indicated in Figs. 1 and 2. As shown in Fig. 2, the switches are located along the carrier path so that as a carrier approaches the point of departure of its bracket 44 from the guide head 32, it trips the switch 75, causing the piston rod means of cylinder 20 to be stopped before the next following carrier comes to position with its bracket 44 engaged in the guide head. As the succeeding carrier travels along, its bracket enters between the guide members 40, which as already described are held stationary straddling or astride the bracket path, and the carrier then trips the switch 76 to cause retraction of the piston rod 47, whereupon the operation of cylinder 20 is resumed to give the desired weaving or sinuous motion to the carrier and the articles A passing through the bath. The preceding carrier, it will be appreciated, passes out of engagement with the head 32 before reciprocation again begins.

It is to be noted that with the arrangement described, it is not necessary to time the movements of the cylinders 20 and 45 so that the piston rod 47 as it is projected meets the stop plate 27 as the latter moves rearwardly to the stopping point. In other words, the position and direction of movement of the abutment means, specifically the stop plate, make no difference in halting reciprocation of the piston rod means of cylinder 20 at the desired point. If the plate 27 is moving forwardly beyond the stopping point upon projection of piston rod 47, it will upon rearward return movement engage the projected piston rod at the predetermined location. If the plate 27 is to the rear of the predetermined point and moving rearwardly, it will be engaged and forced forwardly by the piston rod 47, while if it is to the rear of that point and moving forwardly, it will complete its forward movement and come up against the projected rod 47 on its return. Again, if the plate 27 is forward of the stop point and moving rearwardly when the rod 47 is projected, it will during its rearward movement engage the projected rod, either after or just as the rod comes to fully extended position. The apparatus therefore need not be complicated by any timing or coordinating mechanism to provide a particular relation to each other of the operation or movements of the cylinders 20 and 45, permitting a simple and trouble-free construction.

It may be pointed out that it is not necessary for the reciprocable cylinder 45 to be arranged to project the piston rod 47 in the same direction as the piston rod 21 of cylinder 20. It might, for example, have the rod 47 projectable opposite to the direction of the piston rod 21, and stop reciprocation of the latter in substantially the same manner as described. Again, the cylinder 45 might be arranged at right angles to cylinder 20 and project its piston rod 47 transversely of the path of plate 27 or other abutment means on the piston rod means to halt reciprocation. Other changes might of course be made, as for example in the particular means employed for automatically reversing the direction of the piston rod 21 or the means for controlling actuation of the piston rod 47.

I claim:

1. Apparatus for imparting a laterally oscillating movement to a traveling article carrier, comprising first fluid-actuated cylinder means including piston rod means disposed for reciprocation substantially normal to the path of said carrier, a guiding head mounted on said piston rod means having a pair of substantially parallel resiliently mounted guide rail members arranged parallel to said carrier path and movable transversely thereof by said first cylinder means, valve means controlled by said piston rod means for continuously reversing the direction of movement of the piston rod means, means on said carrier engageable in said head, abutment means on said piston rod means, second fluid-actuated cylinder means of greater effective area than said first cylinder means and arranged parallel thereto, a source of actuating fluid under pressure common to the first and second cylinder means, piston rod means in said second cylinder means projectable into engagement with said abutment means at a predetermined point intermediate the extreme positions of the first cylinder piston rod means for halting reciprocation thereof with said head located straddling the path of said engaging means on a carrier to receive the engaging means between said guide members, solenoid valve means controlling flow of actuating fluid to the second cylinder means for projection and retraction of the second piston rod means thereby, and electrical circuit means for actuating the solenoid valve means including switch means successively operable by a carrier in travel along said head to effect retraction of the second piston rod means from engagement with the abutment means and to effect projection of the second piston rod means to said point for engagement of the abutment means.

2. Apparatus for reciprocating a moving article carrier or the like transversely of its path, comprising a first fluid-actuated cylinder and piston, a piston rod extending from the piston to adjacent said path reciprocable transversely thereto, means to guide said piston, a guiding head carried by said piston rod having a pair of spaced guide members extending generally parallel to said path, valve means controlled by movement of the piston rod for continuously reversing actuation of the first cylinder and piston to effect reciprocation of the rod, a stop member fixed relative to the rod, a member on an article carrier adapted to engage between said guide members in movement of the carrier along said guiding head, a second cylinder and piston disposed parallel to the first cylinder and piston and having a second piston rod projectable against said stop member on the first piston rod to stop movement of the first rod, means supplying actuating fluid under pressure to said first and second cylinders, the end of said second rod upon projection thereof engaging with the stop member at a point locating the guide members astride the path of said engaging member of the carrier for reception thereof therebetween, second valve means controlling flow of actuating fluid to the second cylinder for projection and retraction of the second piston rod, and means operable by movement of the carrier upon reception of the engaging member between said guiding members to actuate said second valve means for retraction of the second piston rod to allow reciprocation of the first piston rod and further operable by movement of the carrier upon departure of the engaging member from the guiding head to actuate the second valve means for projection of the second piston to stop movement of the first piston rod.

3. Mechanism for reciprocating a moving article carrier or the like transversely of its path, comprising first fluid-actuated reciprocating means arranged transversely of the carrier path, a guide frame carried by the first reciprocating means adjacent said path having a pair of elongated spaced guide members extending substantially parallel to said path, means resiliently mounting said guide members on the frame, means on a carrier for engaging between said guide members during movement of the carrier, means controlled by movement of the first reciprocating means for continuously reversing the direction of movement thereof, abutment means fixed on and movable with said first reciprocating means, second fluid-actuated reciprocating means movable in one direction to engage and in the opposite direction to disengage said abutment means for respectively halting and permitting reciprocation of the first reciprocating means, said second reciprocating means being arranged to halt said first reciprocating means in a position locating the guide members of the guide frame astride the path of said engaging means to receive the same therebetween, and means operable by movement of the carrier upon engagement of said engaging means between said guide members to effect movement of the second reciprocating means in said opposite direction thereof for transverse oscillation of the carrier in said movement and further operable by carrier movement upon passage of the engaging means from between the guide members to effect movement of the second reciprocating means in said one direction thereof for halting the first reciprocating means.

4. In galvanizing or like apparatus including a tank of liquid and a plurality of suspended article carriers successively traveling in a path along the tank and carrying articles through the liquid, means for imparting an oscillating movement to the carriers and articles transverse of said travel path along the tank, comprising fluid-actuated reciprocating means arranged transversely of said path, means controlled by movement of said reciprocating means for continually reversing the direction of movement thereof, abutment means on and movable with the reciprocating means, guide means carried by said reciprocating means providing a passage substantially parallel to said path, means on each of said carriers for engaging in and moving through said passage during a portion of the travel of the carrier whereby the reciprocating means effects sinuous movement of the carrier and articles carried thereby, fluid-actuated reciprocable means, means operable by movement of a carrier upon movement of the engaging means thereof into said passage to effect movement of the reciprocable means in one direction, means operable by movement of a carrier upon movement of the engaging means thereof out of said passage to effect movement of the reciprocable means in the other direction, said reciprocable means being arranged to engage said abutment means upon said movement in one direction and halt reciprocation of the reciprocating means with the guide means passage in position to receive the engaging means of an approaching carrier and upon said movement in the other direction releasing said abutment means to permit continued reciprocation of the reciprocating means.

5. Apparatus for imparting a sinuous movement to a non-sinuously moving article carrier or the like, comprising fluid-actuated reciprocating means arranged transversely of the path of travel of the carrier and having abutment means thereon movable therewith, means operable by movement of the reciprocating means for continually reversing the direction of movement thereof, a pair of spaced guide members carried by said reciprocating means generally parallel to said carrier path, means on the carrier engaging between the guide members during carrier travel therealong, fluid-actuated reciprocable means disposed for engagement in one direction of movement thereof with the abutment means of the reciprocating means to halt reciprocation thereof at a point locating the guide members astride the path of engaging means for reception of the same therebetween and for retraction in the other direction of movement out of engaging relation with said abutment means to permit reciprocation of the reciprocating means, and means operable by movement of the carrier to effect movement of the reciprocable means in said other direction upon entry of the engaging means between the guide members and to effect movement of the reciprocable means in said one direction upon departure of the engaging means from the guide members.

6. In apparatus for moving articles through a liquid bath including a plurality of carriers traveling successively along the bath and carrying articles through the bath, means for imparting a sinuous movement to articles passing through the bath comprising fluid-actuated reciprocating means directed transversely of the carrier path of travel along the bath including abutment means movable therewith, a pair of spaced elongated guide members generally parallel to said path, means operable by movement of the reciprocating means for continually reversing the direction of movement thereof, engaging means fixed on each of the carriers for passage between the guide members to be reciprocated thereby, fluid-actuated reciprocable means adjacent said reciprocating means, and means controlling reciprocation of the reciprocable means operable by movement of a carrier upon termination of the passage of the engaging means thereof between the guide members to effect movement of the reciprocable means in one direction for engagement with said abutment means and resultant stoppage of reciprocating means movement with the guide members in position to receive therebetween the engaging means of a succeeding carrier, and operable by movement of a succeeding carrier upon reception of the engaging means thereof between the guide members to effect movement of the recprocable means in the other direction for disengagement from said abutment means to allow reciprocation of the reciprocating means.

7. Mechanism for reciprocating a traveling article carrier or the like transversely of its travel path, comprising reciprocating means arranged transversely of said path, a guide frame carried by the reciprocating means adjacent said path providing a guide passage extending substantially parallel to the path, means on a carrier for engaging in and moving through said guide passage during travel of the carrier, means controlled by movement of the reciprocating means for continuously reversing the direction of movement thereof, abutment means on the reciprocating means, reciprocable means movable in one direction to engage and in the opposite direction to disengage said abutment means for respectively halting and permitting reciprocation of the reciprocating means, said reciprocable means being arranged to halt said reciprocating means in position with said guide passage aligned with the path of said engaging means for reception thereof therebetween, and means operable by movement of the carrier to effect movement of the reciprocable means in said opposite direction thereof upon reception of the engaging means in said guide passage and to effect movement of the reciprocable means in said one direction thereof upon departure of the engaging means from said guide passage.

8. Apparatus for oscillating a traveling article carrier or the like transversely of the travel path thereof to impart sinuous travel thereto, comprising reciprocating means arranged transversely of said path and having abutment means thereon movable therewith, means operable by movement of the reciprocating means for continually reversing the direction of movement thereof, means for interengaging a carrier and the reciprocating means to effect transverse oscillation of the carrier while permitting carrier travel whereby the carrier is caused to travel sinuously, reciprocable means disposed upon movement in one direction for engagement with said abutment means to interrupt reciprocation of the reciprocating means and upon movement in the other direction for disengagement from the abutment means to allow reciprocation of the reciprocating means, and means controlling reciprocation of the reciprocable means operable by travel of the carrier to effect movement of the reciprocable means in said other direction upon interengagement of the carrier with the reciprocating means and to effect movement of the reciprocable means in said one direction upon disengagement of the carrier and reciprocating means, said interengaging means being operable by travel of the carrier along the portion of said path adjacent the reciprocating means during interruption of reciprocation thereof.

9. Apparatus for imparting sinuous movement to a traveling article carrier or the like, comprising reciprocating means arranged transversely of the path of carrier travel having abutment means thereon, automatically operating means for continually reversing the direction of movement of said reciprocating means, interengaging means for temporarily connecting a carrier to the reciprocating means to effect oscillation of the carrier thereby transversely of its path during carrier travel past the reciprocating means, said interengaging means effecting said connection upon interruption of reciprocation of the reciprocating means in predetermined position relative to the carrier path without interruption of carrier travel, means movable into and out of engagement with said abutment means respectively to interrupt reciprocation of the reciprocating means in said predetermined position and to allow reciprocation thereof, and means controlling movement of said movable means operable by travel of the carrier to effect disengagement of the movable means from the abutment means upon connection of the carrier to the reciprocating means and to effect engagement of the movable means with the abutment means upon termination of said connection.

10. Apparatus for imparting to a traveling article carrier or the like an oscillating motion transverse of its path, comprising means having reciprocating movement transversely of said path, means for connecting said reciprocating means to the carrier during carrier travel therepast without interruption of said travel, said connecting means effecting the connection automatically upon halting of the reciprocating means in predetermined position relative to the carrier path, means for halting reciprocation of the reciprocating means in said position and for allowing resumption of said reciprocation, and means controlling said halting means operable by movement of the carrier to effect operation of the halting means for halting the reciprocation upon disconnection of the carrier from the reciprocating means and to effect operation of the halting means for allowing resumption of reciprocation upon connection of the carrier and reciprocating means.

References Cited in the file of this patent

UNITED STATES PATENTS

| | | |
|---|---|---|
| 2,686,135 | Butler | Aug. 10, 1954 |
| 2,750,923 | Daniel | June 19, 1956 |
| 2,751,311 | Rosseau | June 19, 1956 |